United States Patent [19]
Rebish

[11] 3,850,413
[45] Nov. 26, 1974

[54] FOUNDRY MIXING MACHINE

[75] Inventor: Edward J. Rebish, Euclid, Ohio

[73] Assignee: Acme-Cleveland Corporation, Cleveland, Ohio

[22] Filed: Nov. 13, 1972

[21] Appl. No.: 305,839

Related U.S. Application Data

[63] Continuation-in-part of Ser. No. 211,925, Dec. 27, 1971, Pat. No. 3,773,299.

[52] U.S. Cl. .................. 259/4, 259/165, 259/168
[51] Int. Cl. ............................................. B28c 5/04
[58] Field of Search .............. 259/180, 2, 4, 1, 145, 259/150, 3, 151, 153, 161

[56] References Cited
UNITED STATES PATENTS

| | | | |
|---|---|---|---|
| 2,071,846 | 2/1937 | Lamb | 259/180 |
| 2,953,359 | 9/1960 | Mau | 259/180 |
| 3,158,358 | 11/1964 | Fischer | 259/44 |
| 3,400,914 | 9/1968 | Benassi | 259/8 |
| 3,400,915 | 9/1968 | Onishi | 259/8 |

Primary Examiner—Robert W. Jenkins

[57] ABSTRACT

A foundry mixing machine is disclosed for mixing a mold material component with a binder component comprising a mixer for dispersing the binder component into a dispersion and provisions for establishing a flow of the mold material component to traverse the dispersion a plurality of times to enable a complete mixing of the mold material and binder components. The foregoing abstract is merely a resume of one general application, is not a complete discussion of all principles of operation or applications, and is not to be construed as a limitation on the scope of the claimed subject matter.

18 Claims, 2 Drawing Figures

FOUNDRY MIXING MACHINE

CROSS-REFERENCE TO RELATED APPLICATION

This application is a continuation-in-part of my prior application Ser. No. 211,925 filed Dec. 27, 1971, now U.S. Pat. No. 3,773,299.

BACKGROUND OF THE INVENTION

This invention relates to mixing machines and more particularly to foundry mixing machines for mixing a mold material component and a binder component.

The prior art foundry mixing machines can be generally divided into two types. The first type of mixing machine included machines having an internal impeller or an internal mixing blade to mix a mold material component with a binder component. This type of mixer worked satisfactorily but would experience clogging after a period of use. A substantial amount of mold material component was also wasted at the beginning and end of each mixing cycle. In addition, the cleaning of the machine after completion of a mixing cycle was a difficult task. The mixed mold material and binder component within the machine was constantly deteriorating causing non-uniformity in material output due to delays and the like. A further disadvantage of this type of machine was the wear suffered by the impellers and other internal moving parts due to the abrasive quality of mold material.

A second type of prior art mixing machine included those generally classified as a centrifugal force mixing machine. In these machines, the material component would fall in proximity to a rotating disc which dispersed the coating component there-from. However, this type of mixing machine did not offer a complete mixing due to the fact that large droplets of the coating component would be dispersed by the rotating disc causing portions of the material component to be saturated and leaving other portions of the material component unmixed. In addition, these machines provided only one opportunity for the mixing to be completed and were unable to function with the large variety of mold material components and binder components required by many foundries. Therefore, these machines never found a application in the foundry industry but were restricted to merely coating processes.

The difficulties of the prior art foundry mixing machines became more acute with the introduction of a multi-component binder into the foundry industry. The first type of mixing machine has to be modified to include three impellers. Two of the impellers were used to mix each of the binder components with a portion of the mold material component and the third impeller was used to mix the two binder components. This increased the cost and complexity of these machines and the problem of clogging in the third impeller was still present. For some of the rapidly curing multi-component binders, the impeller type mixing machine was completely impractical since the machine could not mix the binder components rapidly enough to avoid the binder curing within the machine.

The use of the mulitcomponent binder was also inapplicable to the prior art centrifugal force mixing machines. Generally, these centrifugal mixing machines dispersed the coating components in large droplets and did not afford proper mixing to the components. My prior invention, Ser. No. 211,925 filed Dec. 27, 1971 solved the problem of large droplets experienced by the prior art. This application disclosed a foundry mixing machine capable of producing a fine dispersion or mist of the binder component. However, this invention still had the disadvantage of the prior centrifugal mixers in providing only a single opportunity for the mold material component to mix with the binder component.

Therefore, an object of this invention is to produce a foundry machine for mixing a mold material component and a binder component which uses centrifugal force as a method of mixing and can disperse the binder component into a fine dispersion to insure proper mixing. Another object of this invention is to produce a foundry machine for mixing a mold material component and a binder component which enables the mold material component to be mixed with the binder component a plurality of times.

Another object of this invention is to produce a foundry machine for mixing a mold material component and a binder component which is capable of producing a mixture having a cured strength comparable to a laboratory standard mixer.

Another object of this invention is to produce a foundry machine for mixing a mold material component and a binder component which is inexpensive.

Another object of this invention is to produce a foundry machine for mixing a mold material component and a binder component which has little or no waste at the beginning and end of each mixing cycle.

Another object of this invention is to produce a foundry machine for mixing a mold material component and a binder component which is capable of accommodating a variety of mold material components and binder components.

SUMMARY OF THE INVENTION

The invention may be incorporated in a foundry machine for mixing a mold material component and a binder component, comprising in combination, mixer means for dispersing the binder component in a geometric direction, means for directing the binder component to said mixer means, and means for establishing the mold material component to traverse said geometric direction to mix with the binder component and to subsequently traverse said geometric direction to enable additional mixing thereby.

Other objects and a fuller understanding of the invention may be had by referring to the following description and claims, take in conjunction with the accompanying drawing.

DESCRIPTION OF THE PREFERRED EMBODIMENT

Figure 1:
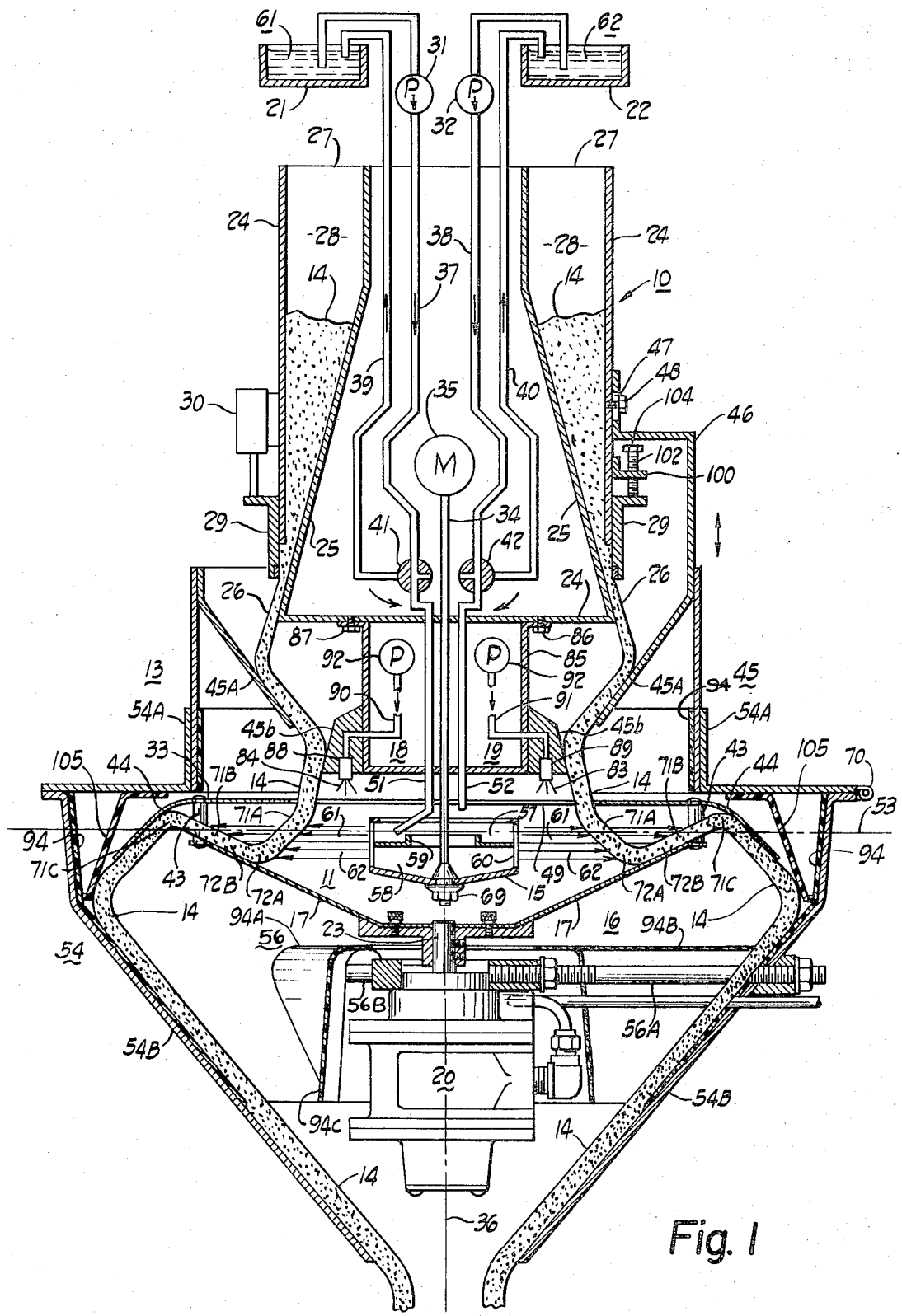
FIG. 1 shows a sectional view of a foundry machine for mixing a mold material component and a binder component; and, FIG. 2 shows a variation of the foundry machine shown in FIG. 1.

FIG. 1 illustrates a foundry machine for mixing a mold material component 14 and a binder component 61 comprising mixer means 11 for dispersing the binder component 61 in a geometric direction, means 18 for directing the binder component 61 to the mixer means 11 and means shown generally as 13 for establishing the mold material component 14 to traverse the geometric direction of the dispersion of the binder component 61 to mix with the binder component and to subsequently traverse the geometric direction of the dispersion of the binder component 61 to enable additional mixing thereby. The means 13 for establishing the mold material component to traverse the geometric direction of the dispersion includes discharge means 10 shown as a housing 24 and a surface 25 established relative to the housing 24 to form a channel 28 therebetween. The channel 28 is shown being half occupied by the mold material component 14 which mold material component is shown as sand but can be any material suitable for molds or cores in a foundry process. The channel 28 also includes a discharge opening 26 for discharging the mold material component 14. A loading opening 27 is established on one end of the general vertical channel 28 for loading the mold material component 14 into the discharge means 10. The discharge opening 26 is shown to be substantially annular about an axis of symmetry 36 of the housing 24 and includes gate means 29 to open and close the discharge opening 26. An actuator 30 fixed to the housing 24 moves the gate means 29 to close or open the discharge opening 26 upon the command of an operator. A support 100 is mounted to the housing 24 having a screw 102 which is adjustable by a hand adjustment 104. The screw 102 adjusts the maximum travel of the gate means 29 to vary the size of the discharge opening 26.

A second housing 85 is attached by bolts 86 and 87 to the housing 24. The housing 85 includes air jet means or air nozzles 88 and 89 which are connected by the tubes 90 and 91 to an air compressor pump 92. The air compressor pump 92 is shown for the sake of simplicity to be within the housing 85 but typically would be found without the housings 24 and 85 of the foundry machine. The invention is shown to include means 18 and 19 directing the first binder component 61 and a second binder component 62 to the mixer means 11 to be dispersed thereby. The invention operates with either a single or multiple component binder. The directing means 18, 19 include a first and a second reservoir 21 and 22 which are interconnected by conduits or connector means 37, 38, 39 and 40 with a first and a second pumping means 31 and 32 and a first and a second valve means 41 and 42 for the first and second binder components 61 and 62, respectively. Each of the valve means 41 and 42 has an actuated and an unactuated position. The valve means 41 and 42 are shown as three way valve means in the actuated position. First and second component tubes 51 and 52 direct the first and second binder components 61 and 62 to the mixer means 11.

The mixer means 11 includes rotor means 15 which is mounted below the discharge means 10 on a substantially vertical shaft 34. Means shown as a motor 35 rotates the rotor means 15 to disperse the binder component in a geometric direction. The geometric direction is along a geometric plane 53 which is substantially horizontal and extends through the rotor means 15. The direction of dispersion of the binder components is shown by the arrows emanating from the rotor means 15 in FIG. 1. The rotor means 15 includes rotor opening means 60 which are shown as vertical slots having a long length relative to the width thereof. However, the rotor opening means 60 could be a series of small openings.

The rotor means 15 is shown as a two-level container having an upper level 57 and a lower level 58 separated by a separator 59 and secured to shaft 34 by a nut 69. The rotor means 15 is removable to aid in cleaning and to install rotor means of different design. The invention can also operate with a single level rotor means. My prior application Ser. No. 211,925 disclosed various types of rotor means which are all compatible with this invention.

The means 13 establishing the flow of mold material component 14 includes director means 45 and diverting means 16. The director means 45 is attached to a bracket 46 having a slot 47 and secured to the housing 24 by a bolt 48. The slot 47 in the bracket 46 allows a vertical movement, as shown by the arrow, of the director means 45 to vary the convergence of the mold material component 14. The director means 45 directs the mold material component 14 emanating from the discharge means 10 to pass in proximity to the rotor means 15 and to traverse the geometric direction of the dispersion of the binder components 61 and 62. The director means 45 comprises first director means 45A and second director means 45B. The first director means 45A directs the falling mold material component to converge toward the axis of symmetry 36 whereas the second director means 45B causes the mold material component to slightly diverge from the axis of symmetry 36. The director means 45 directs the mold material component to traverse the geometric plane 53 passing through the rotor means 15 to mix with the binder component being dispersed by the rotor means 15. In FIG. 1, the director means 45 directs the mold material component 14 which is shown falling from the discharge opening 26 by action of gravity to pass in close proximity to the rotor means 15 to be mixed with the dispersion present about the rotor means 15.

The diverting means 16 is shown positioned below the rotor means 15 and within a shield 54. The shield comprises a top shield 54A and a bottom shield 54b. The diverting means 16 diverts the mold material component 14 to again traverse the geometric direction located within the geometric plane 53 to enable additional mixing. The diverting means 17 diverts the mold material component to have a substantial directional component parallel to the geometric direction of the dispersion after the mold material component has traversed the dispersion. The diverting means illustrated in FIG. 1 shows a conical diverting surface 17 which is mounted on a shaft 23 connected to a motor 20. The motor 20 is supported by spoke-like supports 56 attached to the shield 54B. The motor 20 is shown as an air motor but an electric or hydraulic motor is equally adaptable. In this embodiment, the diverting means 16 is supported by three supports only two being shown wherein support 56A is shown in section and support 56B is shown in elevation. The conical diverting surface 17 rotates about the axis 36 independent of the rotation of the rotor means 15. The diverting means also includes a circular cover 33 which is attached to the conical diverting surface 17 by the fasteners 43. The circular cover 33 has a central aperture 49 to enable entrance of the mold material component 14 and the circular cover 33 also includes a downward deflecting portion 44 which extends out from the conical diverting surface 17. A mold material shield 105 is supported by the shield 54B and directs the mold material component 14 and binder components 61 and 62 to the shield 54B. The shield 105 is made of a rigid material such as stainless steel or the like to absorb the impact of the mold material component. The bottom shield 54B, the mold material shield 105 and the diverting means 16 is pivotable about an axis 70 to enable the apparatus to be cleaned and inspected. The shield 54 can be made of or coated with a smooth surface to inhibit the mixed mold material component 14 and the first and second binder components 61 and 62 from sticking thereon. This can also be accomplished by covering the surfaces 54A and 54B with a disposable liner 94. The shield 54 is shown covered with a disposable liner 94 to allow rapid cleaning. The liner 94 includes members 94A and 94B which extend over the radial spoked supports 56. A portion of the liner 94C covers the motor 20.

The invention operates in the following manner. The first and the second binder components 61 and 62 of a multicomponent binder are stored in the first and second reservoirs 21 and 22, respectively. The mold material component 14 is loaded into the channel 28 of the discharge means 10 through the loading opening 27. This loading process can either be a continuous process or the channel 28 can be of a size large enough to hold a sufficient amount of mold material component 14 for a given mixing application. The gate means 29 can be kept in a closed position by the actuator 30 to allow the mold material component 14 to be loaded. The first and second valve means 41 and 42 are set in the unactuated position by rotating the valve means 90° in the direction of the adjacent respective arrows. When the first and second pumping means 31 and 32 are energized, the first pumping means 31 circulates the first binder component 61 from the reservoir 21 by connector means 37 to the first valve means 41 and back through the connector means 39 to the first reservoir 21. The second binder component 62 is pumped from the second reservoir 22 by the second pumping means 32 through connector means 38 to the valve means 42 and returns to the second reservoir 22 by connector means 40. This circulation insures that a fresh supply of binder component under pressure is available at the first and second valve means 41 and 42 at any given time. This circulation also prevents any premature curing which might take place within the connector means, pumping means or valve means. When the motor means 35 is energized, the shaft 34 and the rotor means 15 rotates at a very high speed. Typically this rotation can be between 5,000 RPM and 15,000 RPM for rotor means having diameters between 2.0 and 6.0 inches to produce a surface speed within a range of 3,000 to 16,000 feet per minute. The motor means 20 for rotating the conical diverting surface 17 is also energized to rotate independently of the rotor means 15. The rotation of the conical diverting surface may be typically between 100 and 2,000 RPM. When the rotor means 15 has achieved a suitable revolution rate, the first and second valve means 41 and 42 are rotated into the actuated position, as shown, by an operator. This allows the first and second pumping means 31 and 32 to pump the first and second binder components 61 and 62 from the first and second reservoirs 21 and 22 through the first and second component tubes 51 and 52, respectively, into the rotating rotor means 15. The first binder component 61 is directed from the first component tube 51 into the upper level 57 whereas the second binder component 62 is directed from the second component tube 52 into the lower level 58. The rotation of the rotor means 15 creates a centrifugal force to move the first and second binder components 61 and 62 to be dispersed by the action of centrifugal force. Thus, the rotation of the rotor means 15 forces the first and second binder components 61 and 62 through the rotor opening means 60 to be dispersed or atomized in proximity to the rotor means 15. The first binder component 61 is dispersed as shown by the arrows designated 61, whereas the second binder component 62 is dispersed as shown by the arrows designated 62. Each binder component is dispersed in a geometric direction which is parallel to the geometric plane 53. The rotor means 15 forms a dispersion of the binder components about the rotor means in all geometric directions parallel to the geometric plane 53 which extends through the rotor means 15 and is perpendicular to the axis of thr rotor means 15. When the dispersing process by the rotor means 15 is established, the operator opens the gate means 29 to establish the flow of the mold material component 14 directed by the director means 45 to pass in proximity to the rotating rotor means 15. As the mold material component 14 passes the rotor means 15, the mold material component traverse the dispersion of the first binder component 61 and mixes therewith at an area designated 71A. The mold material component 14 continues to fall and traverses the dispersion of the second binder component 62 and mixes with the mixture of the mold material component 14 and the binder component 61 at an area designated 72A. The mixing at areas 71A and 72A takes place when the mold material component is in a freely falling condition. This allows a greater binder penetration through the falling material and produces a more complete mixing. The falling mold material component at mixing points 71A and 72A is a porous curtain of falling material. The invention takes advantage of this porosity and enables additional mixing with the first and second binder components without the expense of adding an additional mixing apparatus. The plural mixing is accomplished by the rotating conical diverting surface 17 striking the mold material component 14 which is falling from the discharge means 10 to upturn the falling mold material component 14 to again traverse at least a portion of the dispersion of the first and second binder components 61 and 62. The diverting means 16 diverts the mold material component 14 upwardly to enable the second binder component 62 to mix with the mold material component 14 and the first and second binder components 61 and 62 at the area 72B and to continue the upward movement to again mix with the first binder component 61 at area 71B. The mold material component 14 and first and second binder components 61 and 62 continue the upward movement until striking the downward deflecting portion 44 of the circular cover 33. In the area designated 71C, the mold material component 14 is again mixed with the binder component. Thus, the mold material component has an opportunity to mix with the first binder component a minimum of three times. In actual operation of the machine as illustrated in FIG. 1, the first and second binder components 61 and 62 do not remain well defined as indicated by the arrows. After the dispersion has been traversed by the mold material component 14 at areas 71A and 72B, the first and second binder components 61 and 62 are intermingled and are forced outwardly such that both the first and second binder components 61 and 62 are available for mixing at the areas designated 71B, 72B and 71C. The use of a conical surface 17 insures that the first and second binder components 61 and 62 which pass through the mold material component 14 at areas 71A and 72A are focused to be available for additional mixing at mixing areas 71B, 72B and 71C. When the mold material component 14 and the first and second binder components 61 and 62 strike the downward deflecting portion 44 of the circular cover 33, the mold material component 14 and first and second binder components 61 and 62 are diverted downwardly to strike the mold material shield 105 to be directed by the shield 54B toward the axis of symmetry 36. The liner 94 is incorporated within the shield 54 to eliminate the need for cleaning the shield after each use. The liner 94 can be made of a material such as plastic which can be cleaned separately from the machine or can be made of a disposable material.

In FIG. 1, the first and second binder components 61 and 62 are not directly mixed with each other prior to mixing with the mold material component 14 but the mold material component 14 is mixed with the first binder component 61 and is subsequently mixed with the second binder component 62. For example, the first binder component 61 can be a resin which is mixed with the mold material component 14, and the second binder component 62 can be a catalyst which is mixed with the mixture of the resin and the mold material component 14 to avoid premature curing of the three component mixture. For slower curing binders, a single level rotor means can be used in which case the binder components 61 and 62 are mixed within the rotor means. The foregoing mixing process can be a completely automatic process requiring an operator to only start and stop the machine. FIG. 1 shows the mixing of binder components 61 and 62 with a mold material component 14 which has a very find particle size. The fact that the mold material component 14 has a fine particle size is emphasized by the fact that the stream of falling mold material component diverges upon impact of the first and second binder components 61 and 62 striking the falling mold material component 14.

The optional air jet means or air nozzels 88 and 89 may be used to aid in insuring a uniform mixing of the components during the initial and final stages of a given mixing process. For example, assume that the gate means 29 is closed, the rotor and the diverting surface 17 are rotating and the first and second binder components 61 and 62 are being pumped into the rotor means 15. Prior to opening the gate means 29, air jets 84 and 83 controlled by the air jet nozzles 88 and 89 are energized for a duration between a fraction of a second and several seconds creating a partial vacuum in proximity to the rotor means 15. As the gate means 29 is opened by the actuator 30, the flow of mold material component 14 does not start immediately but starts as a small amount and increases in flow rate into a stream in accordance with the manner in which the gate means 29 opens the discharge openings 26. During the period of time when a small amount of mold material component 14 is falling, the air jets 83 and 84 cause the mold material components 14 to fall near the rotor means 15 as the established streams shown in FIG. 1. This partial vacuum is sustained after the stream of mold material component is established by action of the rotor means 15. Upon closing the discharge opening means 26 with the gate means 29, the stream of mold material component will again be reduced. The air jet nozzles 88 and 89 will be again energized to maintain the partial vacuum causing the substantially reduced stream to be mixed in a manner similar to the established stream. Thus the air jets 83 and 84 insure that the initial and final flow of mold material component 14 will be mixed as uniformly as the intermediate flow.

Figure 2:
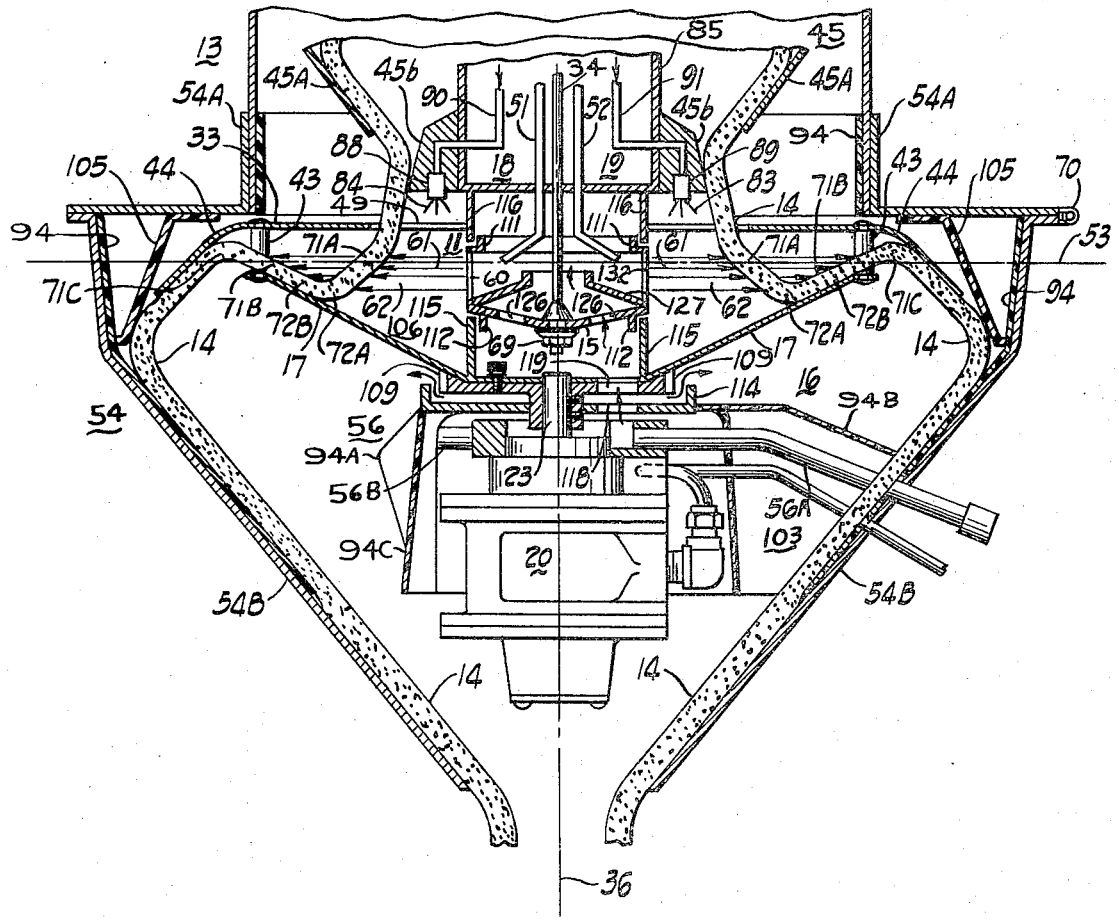

FIG. 2 illustrates a variation of the foundry machine shown in FIG. 1, comprising cup-shaped rotor means 15 having a rotor surface 132 with rotor opening means 60. The means 18 and 19 direct the binder component 61 and 62 to the rotor means 15 which is rotated by the motor 35 shown in FIG. 1 to disperse the binder components through the rotor opening means 60. Director means 45 directs the mold material component 14 to mix with the dispersed binder component 61 and 62 as heretofore described. Rotor shield means shown generally as 106 cooperates with the rotor means 15 for shielding a portion of the rotor means 15 from the falling mold material component 14. The invention includes means 103 for establishing gas flow such as air or the like to the rotor means 15 within the rotor shield means 106 to be dispersed with the binder component.

The rotor means 15 shown in FIG. 2 includes an upper rotor collar 111 and a lower rotor collar 112 which are annular protrusions from the rotor means 15. The rotor means 15 has a bottom plate 127 and apertures 126 in the bottom of the cup-shaped rotor means 15. The secondary housing 85 includes an upper rotor shield 116 to cooperate with the upper rotor collar 11 to enclose the top portion of the rotor means 15. The upper rotor shield 116 has a circular portion near the rotor means 15 with a diameter commensurate with the diameter of the rotor means 15 to cover the opening thereof. The conical diverting surface 17 includes a lower rotor shield 115 to cooperate with the lower rotor collar 112 in a manner similar to the upper rotor shield 116. The conical diverting surface 17 includes a plurality of holes one of which is shown as 119 which are equally spaced about the axis of symmetry 36. The conical diverting surface 17 also includes fins 109 which act as fan blades to circulate air in an outward direction from the axis of symmetry 36 upon rotation of the conical diverting surface 17. A rotor plate 114 is mounted below the conical diverting surface 17 having a plurality of holes, one hole being shown as 118 to cooperate with the holes 119 in the conical diverting surface 17. In addition, the rotor plate 114 cooperates with the fins 109 to produce an air flow from the space between the rotor blade 114 and the conical diverting surface 17 in a direction from the axis of symmetry 36 as indicated by the arrow. The support 56A is shown as being hollow for establishing an air flow through the support 56 to the rotor means 15 through the holes 118, 119 and 126. The foundry mixing machine shown in FIG. 2 enables the rotor means 15 to be shielded from the mold material component 14 with the exception of the rotor surface 132. The upper and lower rotor shields 115, 116 in cooperation with the rotor surface 132 form a substantially cylindrical structure which is enveloped by the mold material component 14. This variation of FIG. 1 enables an air flow to be directed to the internal portion of the rotor means 15 to be dispersed through the rotor opening means 60. The air flow is established through the support 56A and the holes 118, 119 and 126 to be dispersed through the rotor opening means 60. An air flow is also established through the support 56A and hole 118 to be directed by the fins 109 to flow on the underside of the conical diverting surface 17.

The inventor has discovered that residues are formed by the turbulent air flow back to the rotor means 15 when using a fine particle mold material component. The variation of FIG. 2 eliminates the turbulent air flow back to the rotor means 15 by establishing a continuous air flow from an air source outside of the foundry mixing machine to eliminate the unwanted deposits of mold material and binder component. The inventor has found that deposits of the underside of the director means 45 near the air nozzles 88 and 89 and deposits under the conical diverting surface 17 were the result of turbulent flow of mold material component. The variation shown in FIG. 2 eliminates the turbulent flow and the unwanted deposits when a fine particle size mold material component is used with this foundry mixing machine. The source of air flow can be motivated only by the centrifugal force of the rotor means 15 or could be under pressure by an external air compressor or the output of the air motor 20 or an air motor 35. The inventor has determined that air flow through the bottom of the rotor means 15 or from the top of the rotor means are equally effective in eliminating the unwanted turbulent flow of mold material component.

The invention is able to accommodate a wide range of materials used by a foundry in a mold or core making process. For an example, viscosity ranges of binder components between 0.8 and 6.0 on the stokes scale can be encountered. A wide range in particle size of the mold material component 14 can be used with the invention. The invention can also accommodate binders having large variation in curing time.

Experiments by the inventor have demonstrated that the mixture of mold material component 14 and binder components 61 and 62 has a greater fluffiness than a similar mixture achieved by the prior art mixing processes. Mold material and binder components mixed by the disclosed invention have as much as 18 percent lower weight per unit volume than similar materials mixed by the prior art processes. The lower density allows an easier flow of the mixture and enables more exact mold and core forms to be made. The mixing process disclosed in this invention does not damage the mold material component by grinding and breaking the material as commonly experienced in the prior art processes incorporating internal impellers and the like. Accordingly, re-processed mold material component can be reused producing a more economical foundry process. Experiments indicate that the foundry mixing machine does not discriminate between small and large particles of mold material component as was found in the prior art machines. This disadvantage of the prior art machines produced variations in strength of the molds and cores which could cause defective castings resulting in severe economic losses. Finally, tests have shown that this invention produces a mixture which is stronger than other production mixing machines including the machine disclosed in my prior application Ser. No. 211,925. That machine produced a mixture having 80 percent of the strength of a mixture produced by a laboratory standard mixer. Mixtures produced by this invention have shown strengths exceeding 90% of the same standard. These tests reflect the superior mixing ability of this invention over the prior art.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A foundry machine for mixing a mold material component and a binder component, comprising in combination,
mixer means for dispersing the binder component in a geometric direction,
means for directing the binder component to said mixer means,
and means for establishing the mold material component to traverse said geometric direction a first time to mix with the binder component and to subsequently traverse said geometric direction a second time to enable additional mixing thereby and to again traverse said geometric direction a third time.

2. A foundry machine for mixing a mold material component and a first and a second binder component, comprising in conbination:
mixer means for dispersing the first and second binder components,
means for directing the binder components to said mixer means,
and means for establishing the mold material component to traverse the first and second binder component, respectively, and to subsequently traverse the second and first binder component, respectively.

3. A foundry machine for mixing a mold material component and a binder component, comprising in combination:
mixer means for dispersing the binder component along a substantially horizontal geometric plane,
means for directing the binder component to said mixer means,
and means establishing the mold material component to traverse said substantially horizontal geometric plane to mix with the binder component and to subsequently traverse said substantially horizontal geometric plane to enable additional mixing thereby.

4. A foundry machine for mixing a mold material component and a binder component, comprising in combination:
mixer means for dispersing the binder component in a geometric direction,
means for directing the binder component to said mixer means,
means for discharging the mold material component to traverse said geometric direction to mix with the binder component,
diverting means,
and means for moving said diverting means to direct the mold material component to have a substantial component of direction parallel to said geometric direction to enable additional mixing thereby.

5. A foundry machine for mixing a mold material component and a binder component, comprising in combination:

mixer means, means for directing the binder component to said mixer means, said mixer means dispersing the binder component about a geometric plane, means directing the mold material component to traverse said geometric plane to mix with the binder component, and diverting means for directing the mold material component to again traverse said geometric plane to enable additional mixing thereby.

6. A foundry machine as set forth in claim 5, wherein said diverting means includes a conical diverting surface, and means for mounting said conical diverting surface in proximity to said mixer means.

7. A foundry machine as set forth in claim 6, wherein said diverting means includes, a circular cover having a central aperture for entrance by the mold material component, said circular cover having a deflecting portion on the circumference thereof, and means for mounting said circular cover to said conical diverting surface.

8. A foundry machine for mixing a mold material component and a binder component, comprising in combination:

rotor means, means directing the binder component to said rotor means, means for rotating said rotor means to disperse the binder component in a direction of a geometric plane through said rotor means, means directing the mold material component to traverse said geometric plane to mix with the binder component, and diverting means for directing the mold material component to again traverse said geometric plane to enable additional mixing thereby.

9. A foundry machine as set forth in claim 8, wherein said diverting means directs the mold material component to traverse said geometric plane a third time.

10. A foundry machine for mixing a mold material component and a binder component, comprising in combination:

rotor means, means directing the binder component to said rotor means, means for rotating said rotor means to disperse the binder component, means for discharging the mold material component to fall in proximity to said rotor means to mix with the binder component, and diverting means for upturning the falling mold material component to enable additional mixing.

11. A foundry machine as set forth in claim 10, wherein said diverting means includes a conical diverting surface, and means for mounting said conical diverting surface to be inverted and below said rotor means.

12. A foundry machine as set forth in claim 11, wherein said diverting means includes, a circular cover having a central aperture for entrance by the mold material component, said circular cover having a downward deflecting portion on the circumference thereof, and means for mounting said cover to said conical deflecting surface to establish said downward deflecting portions beyond the circumference of said conical diverting surface.

13. A foundry machine for mixing a mold material component and a binder component, comprising in combination:

a housing for the mold material component, said housing having a discharge opening for discharging the mold material component, rotor means, means for establishing said rotor means to be below said discharge opening, means for directing the binder component to said rotor means, means for rotating said rotor means to disperse the binder component about a substantially horizontal plane, means including said discharge opening for directing the mold material component to fall from said discharge opening to traverse said horizontal plane and mix with the binder component, diverting means, means for establishing a portion of said diverting means below said rotor means, and means for moving said diverting means to upturn the mold material component to again traverse said horizontal plane to enable additional mixing of the mold material and the binder components.

14. A foundry machine for mixing a mold material component and a binder component, comprising in combination:

a housing for the mold material component, a surface established relative to said housing forming a generally vertical channel therebetween, said channel having a loading opening and a substantially annular discharge opening for the loading and discharge of the mold material component, respectively, gate means for said discharge opening to open and close said discharge opening, rotor means, means for mounting said rotor means below said discharge opening on a substantially vertical shaft, means for rotating said rotor means, means directing the binder component to said rotor means to be dispersed thereby, director means including said discharge opening for directing the mold material component to fall from said discharge opening to substantially envelop said rotor means to be mixed with the binder component, diverting means, said diverting means including conical diverting surface, means for mounting said conical diverting surface to be inverted and to be below said rotor means, and means for rotating said conical diverting surface to upturn the falling mold material to enable additional mixing of the mold material component and the binder component.

15. A foundry machine for mixing a mold material component and a binder component, comprising in combination:
rotor means,
means for directing the binder component to said rotor means,
means for rotating said rotor means to disperse the binder component;
means for directing the mold material component to mix with the dispersed binder component,
rotor shield means cooperating with said rotor means for shielding portions of said rotor means from the mold material component,
and means for establishing gas flow to said rotor means within said rotor shield means to be dispersed with the binder component.

16. A foundry machine as set forth in claim 15, wherein said rotor means has an open portion and said rotor shield means cooperates with said rotor means to shield said open portion from the mold material component.

17. A foundry machine as set forth in claim 15, wherein said rotor means has the substantial shape of a cup,
a rotor surface being the side portion of said cup,
said rotor surface having rotor opening means to disperse the binder component therethrough,
and said rotor shield means having a circular portion with a diameter commensurate with the diameter of said cup to cover the open portion of said cup.

18. A foundry machine as set forth in claim 15, wherein said means for establishing gas flow includes means for establishing pressure within the rotor shield means relative to outside of the rotor shield means.

* * * * *